United States Patent [19]
Assfour et al.

[11] 3,895,346
[45] July 15, 1975

[54] VEHICLE SEAT BELT SAFETY SYSTEM

[75] Inventors: Hassan Assfour; Klaus Lindner, both of Altenberg; Walter Bernhardt, Fellbach; Wolfgang Bremer, Oberweier, all of Germany

[73] Assignee: Robert Bosch G.m.b.H., Stuttgart, Germany

[22] Filed: June 28, 1973

[21] Appl. No.: 374,516

[30] Foreign Application Priority Data
Dec. 13, 1972 Germany.......................... 2260927

[52] U.S. Cl........... 340/52 E; 340/278; 307/10.5 B; 180/82 C
[51] Int. Cl............................................ B60r 21/10
[58] Field of Search................. 340/52 E, 53, 278; 307/10.5 B; 180/82 C, 101, 102

[56] References Cited
UNITED STATES PATENTS
| | | | |
|---|---|---|---|
| 3,742,448 | 6/1973 | Motz | 340/52 E |
| 3,748,640 | 7/1973 | Sardo, Jr. | 340/52 E |

*Primary Examiner*—Alvin H. Waring
*Attorney, Agent, or Firm*—Spencer & Kaye

[57] ABSTRACT

In a vehicle safety system a seat belt monitoring circuit includes a belt-operated switch, a seat-operated switch, a logic circuit responsive to the position of these switches, an activating switch responding to the logic circuit and a warning system as well as a starter interlock system both placed in an activated state by the activating switch if, in case of an occupied vehicle seat, the associated seat belt is unfastened or was fastened prior to occupying the vehicle seat.

17 Claims, 6 Drawing Figures

VEHICLE SEAT BELT SAFETY SYSTEM

BACKGROUND OF THE INVENTION

This invention relates to a safety system for the protection of occupants of a vehicle, particularly an automotive vehicle which has at least one safety belt-equipped seat. The safety system is of the type which is provided with a seat switch responsive to the state of the seat (occupied or unoccupied) and a belt switch responsive to the state of the seat belt (fastened or unfastened). The safety system is further of the type that is provided with a starter interlock system for the engine and with an audio-visual warning system.

Safety systems of the afore-outlined type warn the occupants of the vehicle that the seat belts are not properly fastened and, in such a case, prevent the starting of the engine.

In known safety systems of this type the seat switches and belt switches are combined in such a manner that a warning system is actuated and the starting of the engine is prevented if, subsequent to the actuation of a seat switch, the safety seat belt associated with that seat is not fastened. The purpose sought to be accomplished with this system is to ensure that in a moving vehicle at least the occupants of the front seats are protected by properly fastened seat belts. The disadvantage of these known safety belt monitoring circuits resides particularly in the fact that an occupant can avoid fastening his seat belt without thereby causing an activation of the warning system and the starter interlock by, for example, maintaining the seat belt continuously in a fastened position and sliding it behind the back rest.

SUMMARY OF THE INVENTION

It is an object of the invention to provide an improved safety system of the aforenoted type which does not allow a circumvention of the system as described above.

This object and others to become apparent as the specification progresses, is accomplished according to the invention in which, briefly stated, there is provided an activating switch for operating the starter interlock system and the warning system. The activating switch is controlled in such a manner by means of a logic circuit responding to the position of the seat switch and belt switch that an engine start is prevented and further, the warning system emits a signal if, in case of an occupied seat, the associated safety seat belt is either not closed or was closed prior to occupying the seat.

According to a further development of the invention, the vehicle safety system is simplified and rendered more economical by the provision of simple, normally open or normally closed switches as belt and seat switches and by associating each belt switch with a threshold switch formed as a semiconductor switch.

In addition to eliminating the afore-outlined disadvantages of known safety systems, the invention has the advantage that, particularly if integrated circuit components are used, it may be built in a very simple, inexpensive and space-saving manner.

DESCRIPTION OF THE PREFERRED EMBODIMENTS

Figure 1:
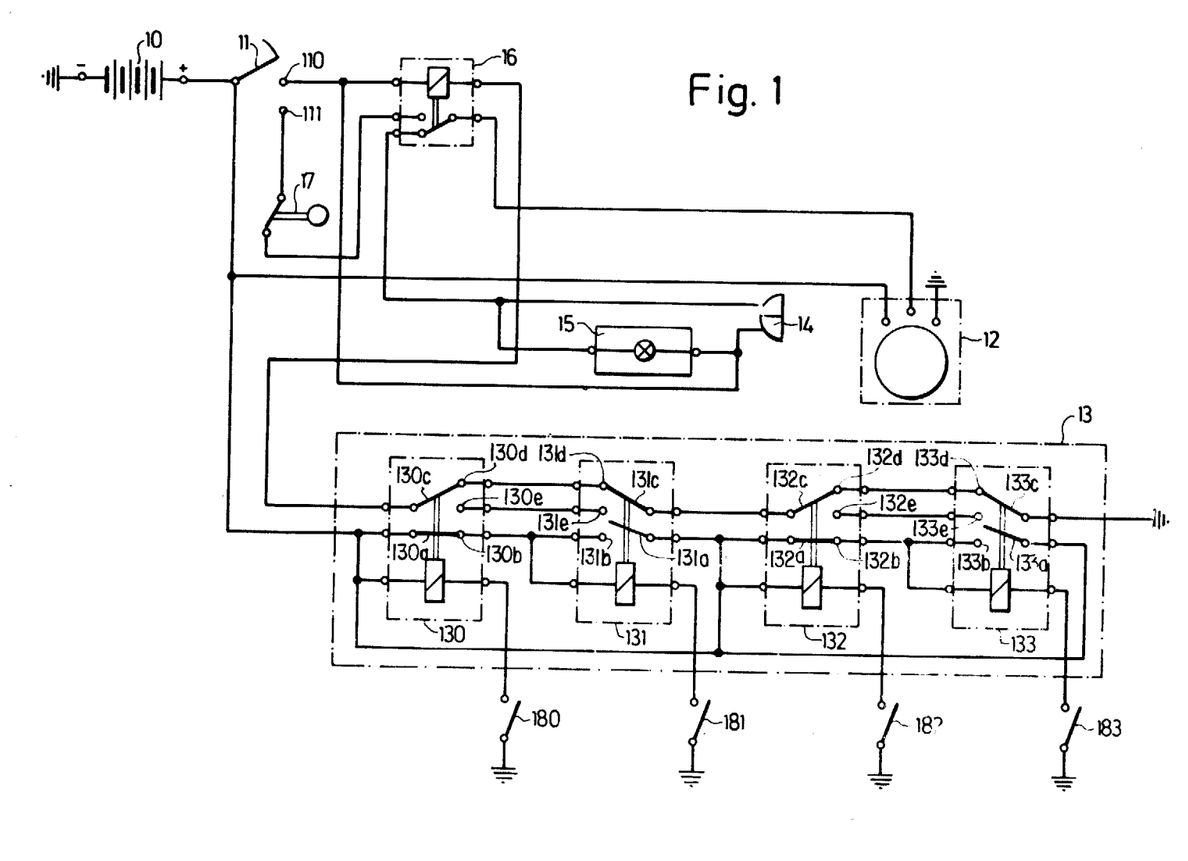
FIG. 1 is a circuit diagram of a first embodiment of the invention utilizing an activating relay and incorporating normally open seat and belt switches.

Turning now to the circuit diagram illustrated in FIG. 1 showing the first embodiment of the invention, there is provided a battery 10, the positive pole of which is connected with the movable contact of an ignition switch 11, the engine starter motor 12 and a logic circuit 13. The switch-on contact 110 of the ignition switch 11 is connected, on the one hand, with a warning circuit of a warning system comprising a buzzer 14 and a visual warning device 15 and, on the other hand, with the logic circuit 13 through the solenoid of an activating switch formed as a switching relay 16. In the illustrated position of rest of the relay 16 the warning system 14, 15 is grounded through the starting relay (not shown) forming part of the starter 12. In the energized condition of the relay 16 the starting relay in the starter 12 is connected with the starter contact 111 of the ignition switch 11 through a shutoff switch 17 which preferably is a transmission-operated switch (hereinafter referred to as "transmission switch"), but which also may be, for example, a hand brake-operated switch.

In the logic circuit 13 there are provided two threshold switches formed as relays 130, 132 each having a movable contact 130a, 132a associated with a normally closed contact 130b, 132b and a further movable contact 130c, 132c associated with a further normally closed contact 130d, 132d and a normally open contact 130e, 132e. There are provided two further threshold switches formed as relays 131, 133, each having a movable contact 131a, 133a associated with a normally open contact 131b, 133b and a further movable contact 131c, 133c associated with a normally closed contact 131d, 133d and a further normally open contact 131e, 133e. The contacts 130a, 130b, 131a, 131b, 132a, 132b, 133a and 133b are connected in one series. The beginning and the end of this series connection, as well as a central tap between the relays 131 and 132 are connected to one another and to the positive pole of the battery 10. One terminal of the solenoids of the relays 130–133 is connected with the respective contact 130b, 131b, 132b and 133b of the corresponding relay. The other terminal of the solenoids of the relays 130–133 is grounded through respective belt and seat switches 180, 181, 182 and 183. The relay 130 is associated with the driver belt switch 180, the relay 131 with the driver seat switch 181, the relay 132 with the passenger belt switch 182 and the relay 133 with the passenger seat switch 183. The conductor leading from one end of the solenoid of the relay 16 to the logic circuit 13 is grounded through a series connection of the normally closed contacts 130d – 133d of the relays 130–133. The contact 130e is connected to contact 131e and the contact 132e is connected to contact 133e, so that in the position of rest or in an actuated position of two associated belt and seat switches, the series path containing the movable contacts 130c–133c is electrically conducting.

The logic circuit 13 is so designed that in case the safety seat belts are properly fastened, there is established an electrically conducting connection between the solenoid of the relay 16 and the ground through the path containing the movable contacts 130c–133c of the relays 130–133. When by actuating the ignition switch 11, the positive pole of the battery 10 is connected with the switch-on contact 110, the energizing circuit for the relay 16 is closed and thus the relay 16 connects the starter contact 111 with the starter 12 through the transmission switch 17. In the closed position of the transmission switch 17, that is, in the neutral or in the parking position of the transmission, the starter 12 can be energized by the ignition switch 11. Also, under the aforedescribed conditions, the warning system 14, 15 remains inactive. In case the ground connection of the solenoid of the relay 16 is interrupted, the latter returns to its de-energized condition (position at rest), whereby it grounds the warning system 14, 15 through the starter 12 and interrupts the electrical connection between the starter contact 111 and the starter 12. Under these conditions a starting of the engine cannot be effected and the warning systems 14, 15 is activated. In case the seats are unoccupied and the seat belts are not buckled, the relays 130–133 of the logic circuit 13 are in their position of rest and thus ground the solenoid of the relay 16. In case a seat is occupied, that is, one of the normally open seat switches 181, 183 is closed, the ground connection of the relay 16 is interrupted. Assuming for example, that the seat associated with the seat switch 181 is occupied then the latter will close. As a result, the energizing circuit for and including the solenoid of the relay 131 is closed, and thus the relay 131 attracts. Consequently, the contact 131d opens, thus interrupting the connection to ground of the energizing circuit for and including the relay 16. If now the switch-on contact 110 is actuated, the warning system 14, 15 is activated and the starter 12 cannot be operated. Only when the associated seat belt is buckled, that is, the corresponding belt switch 180 is closed, is the connection to ground re-established by virtue of the energization of the solenoid of the relay 130 through its energizing circuit that includes the battery 10 and the belt switch 180. As the relay 130 attracts, the contact 130e closes. The energizing circuit for the solenoid of the relay 16 is now grounded through contacts 130c, 130e, 131e, 131c, 132c, 132d, 133d and 133c. The relay 16 is thus energizable. If a belt switch 180 or 182 is operated prior to the actuation of the associated seat switch 181 or 183, then the connection to ground of the relay 16 is also interrupted. If subsequently the associated seat switch 181 or 183 is actuated, the associated relay 131 or 133 cannot respond since its energizing circuit was interrupted by the opening of the contact 130b or 132b by virtue of the previous operation of the relay 130 or 132. A correct sequence in actuating the seat and belt switches is therefore indispensable. It is noted that if, for example, the seat switch 181 is actuated first, the normally open contact 131b of the relay 131 will close, thus closing a holding circuit for the solenoid of the relay 131. Thus, when upon subsequent actuation of the belt switch 180 the associated solenoid 130 is energized and its normally closed contact 130b is opened, the thus caused interruption of the energizing circuit of the solenoid 131 is without effect on the latter because of the closed condition of the holding circuit. The circuit described in connection with FIG. 1 may be expanded in a simple manner by means of a further series connection of relays in the logic circuit 13 to include more vehicle seats.

Figure 2:
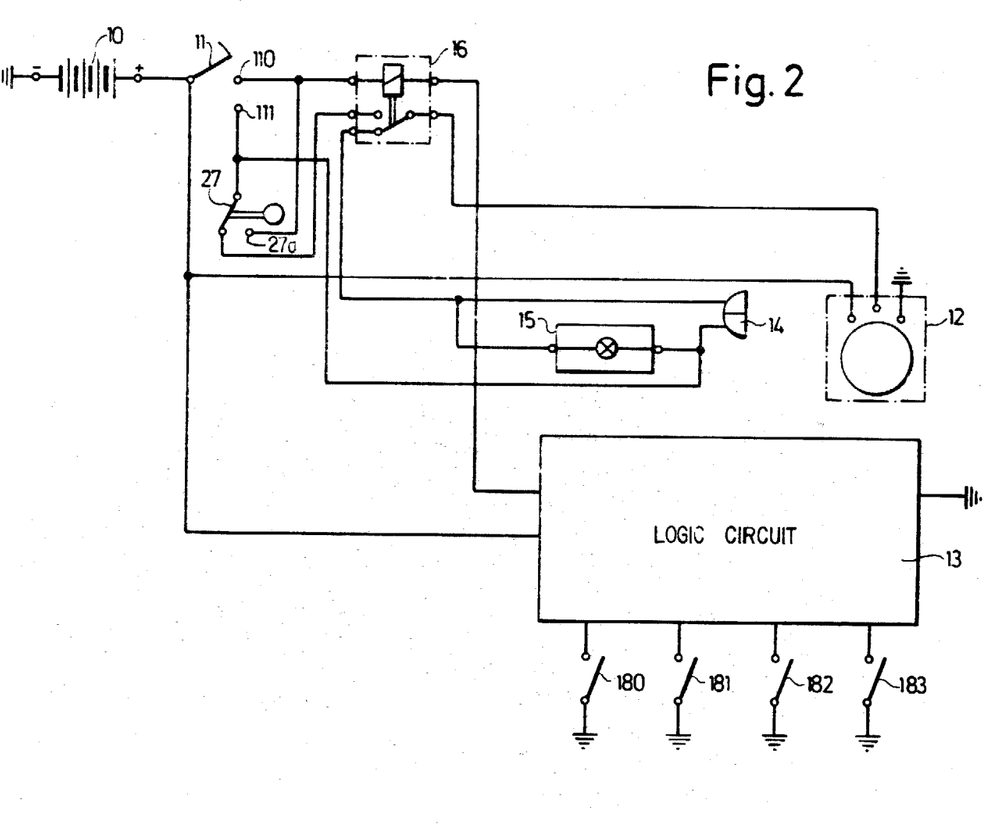
FIG. 2 is a circuit diagram of a second embodiment similar to that shown in FIG. 1, but having a modified circuit arrangement for the activating relay.

Turning now to FIG. 2, the circuit diagram of a second embodiment of the invention shown therein corresponds in substance to that described in connection with FIG. 1. The difference between the two circuits resides in that the normally closed transmission switch 17 of FIG. 1 is replaced by a double-throw transmission switch 27. The warning circuit including the warning system 14, 15 is connected to the starter contact 111. A contact 27a of the transmission switch 27 is connected with the switch-on contact 110.

While in the first embodiment according to FIG. 1, the activation of the warning system 14, 15 is independent of the position of the transmission switch 17, the warning system in the second embodiment illustrated in FIG. 2 cannot be operated in the neutral or parking position of the transmission switch 27 with the exception of the short period for performing the engine starting step. During this short period the current supply of the warning system 14, 15 is effected through the starter contact 111. When the transmission is placed in gear, causing the movable contact of the transmission switch 27 to change its position, the current supply of the warning system 14, 15 occurs through the switch-on contact 110, the contact 27a and the movable contact of the transmission switch 27. In other respects the mode of operation of the circuit according to FIG. 2 corresponds to that of the first embodiment illustrated in FIG. 1.

Figure 3:
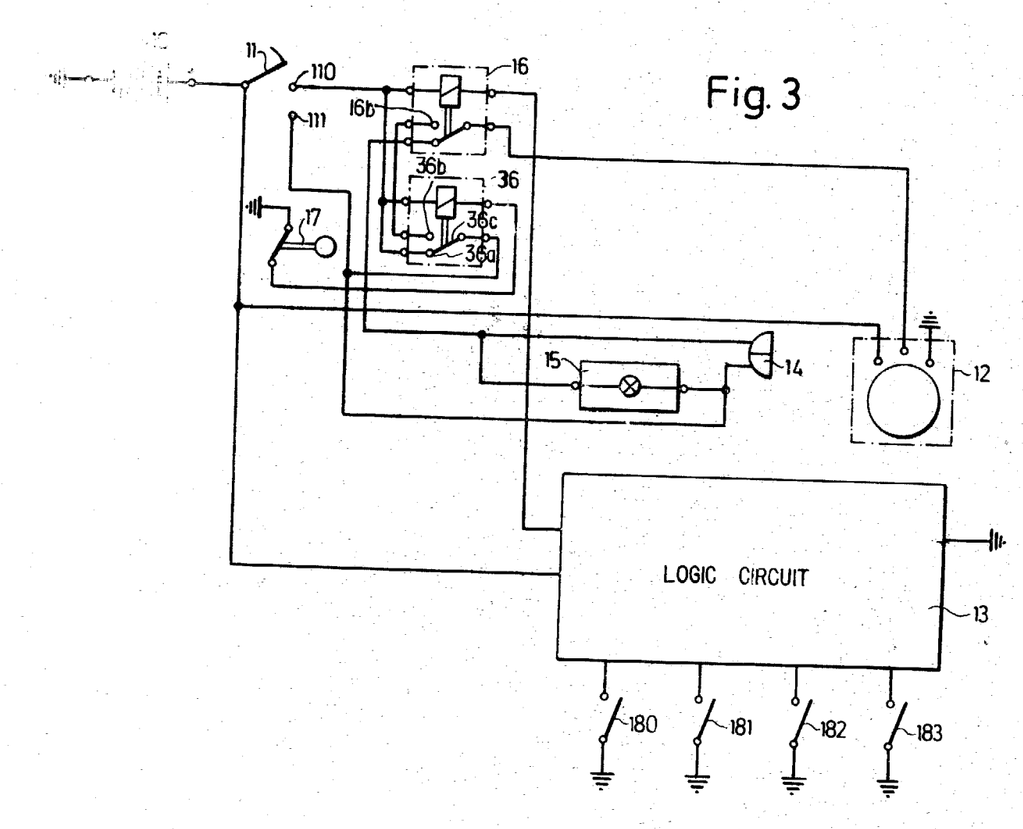
FIG. 3 is a circuit diagram of a third embodiment of the invention including two activating relays.

In FIG. 3 there is illustrated the circuit diagram of a third embodiment of the invention which, in substance, corresponds to the circuit according to FIG. 1, except for the provision of a second actuating switch formed as a switching relay 36. One solenoid terminal of the second relay 36 is connected with the normally closed contact 36a of the relay 36 and with the switch-on contact 110. The other terminal of the solenoid of the second relay 36 is grounded through the transmission switch 17. The normally open contacts 16b and 36b of the two relays 16 and 36 are connected to one another. The current supplying conductors of the warning system 14, 15 is connected with the starter contact 111 as well as with the movable contact 36c of the second relay 36.

The mode of operation of the third embodiment according to FIG. 3 corresponds fully to that of the second embodiment according to FIG. 2. The second relay 36 merely serves the purpose of permitting one side of the transmission switch 17 to be grounded. In the neutral or parking position of the transmission switch 17, the second relay 36 is energized and a current supply of the warning system 14, 15 can be effected, through the starter contact 111, only during the starting period. When the vehicle is driven, that is, when the transmission switch 17 is open, the second relay 36 is de-energized and the current supply of the warning system 14, 15, is effected through the normally closed contact 36a of the second relay 36 and through the switch-on contact 110. An energization of the starter 12 is possible only in the energized condition of both relays 16, 36. This occurs when the transmission switch 17 is in its neutral or parking position and the solenoid of the first relay 16 is grounded through the logic circuit 13.

Figure 4:
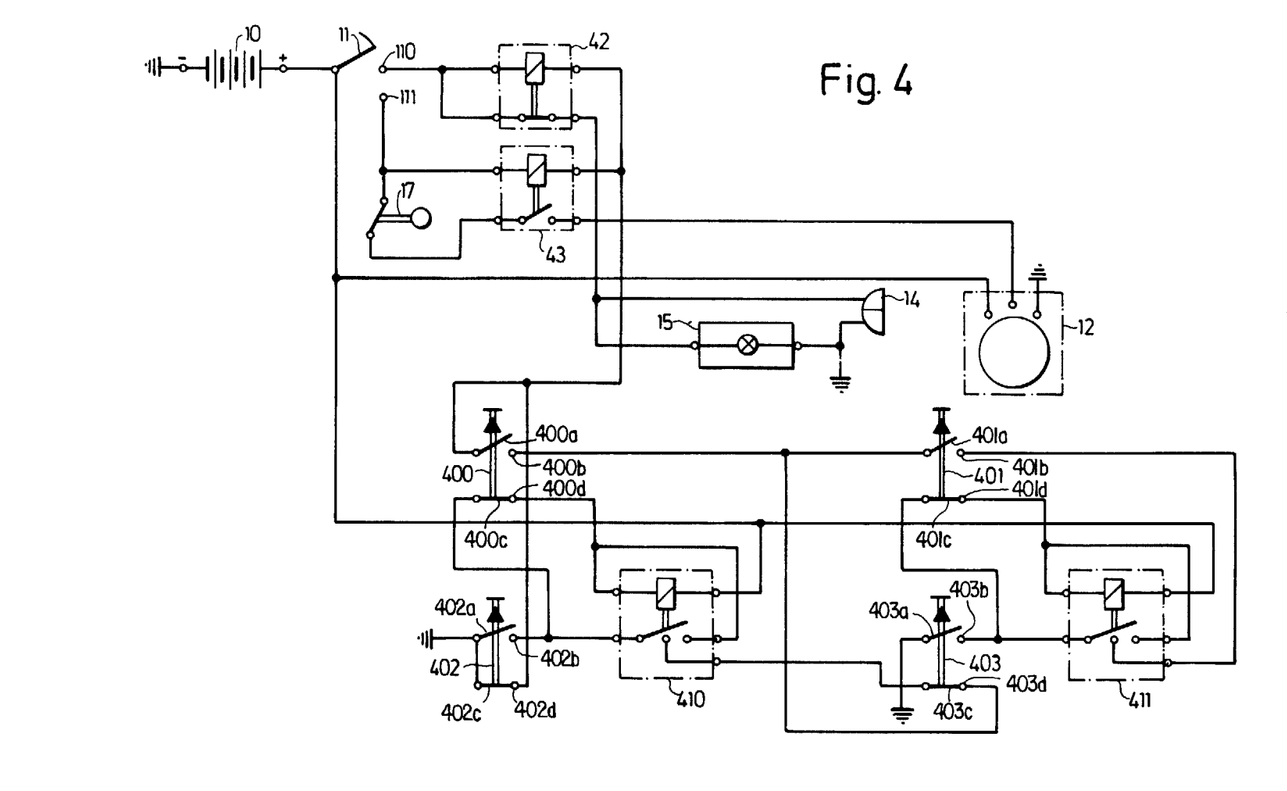
FIG. 4 is a circuit diagram of a fourth embodiment of the invention also including two activating relays.

Turning now to FIG. 4, there is illustrated a circuit diagram of a fourth embodiment of the invention which in essence is comparable to the embodiment illustrated in FIG. 1. Instead of the normally open seat and belt switches of the circuits according to FIGS. 1–3, in the embodiment according to FIG. 4 double-pole single-throw switches 400, 401, 402 and 403 are provided. Each belt and seat switch 400–403 has, respectively, a first movable contact 400a, 401a, 402a, 403a, an associated normally open contact 400b, 401b, 402b, 403b, a second movable contact 400c, 401c, 402c, 403c and an associated normally closed contact 400d, 401d, 402d and 403d. Switches 400 and 402 are, respectively, the driver belt switch and the driver seat switch, while switches 401 and 403 are, respectively, the passenger belt switch and the passenger seat switch. The logic circuit replacing the circuit 13 of FIG. 1 comprises two threshold switches formed of relays 410, 411 each having normally open twin contacts and a movable contact. The relay 410 is associated with the driver seat whereas the relay 411 is associated with the passenger seat. The activating switch for the warning system 14, 15 is constituted by a relay 42 having a normally closed contact and a movable contact and the activating switch associated with the ignition locking system is constituted by a relay 63 having a normally open contact and a movable contact.

One terminal of the solenoid of each relay 42 and 43 can be grounded through the relays 410, 411 and the belt and seat switches 400–403. The other terminal of the solenoid of the relay 42 is connected to the movable contacts of the relay 42 and to the switch-on contact 110. The normally closed contact of the relay 42 is grounded through the warning circuit of the warning system 14, 15. The other terminal of the solenoid of the relay 43 is connected with the starter contact 111. The latter, in turn, is connected through the transmission switch 17 and the movable and normally open contacts of the relay 43 to the starter 12. The connection to ground of the two activating relays 42 and 43 is effected either directly through the normally closed contact 402d of the driver seat switch 402 or through the normally open contact 400b of the driver belt switch 400, the normally closed contact 403d of the passenger seat switch 403, the normally open contact of the relay 410 and the normally open contact 402b of the driver seat switch 402, or through the normally open contact 400b of the driver belt switch 400, the normally open contact 401b of the passenger belt switch 401, the normally open contact of the relay 411 and the normally open contact 403b of the passenger seat switch 403. One terminal of each of the solenoids of the two relays 410, 411 is connected to the positive pole of the battery 10. The other terminal of these solenoids is connected with a normally open contact of the respective relay 410 and 411 and is grounded — in the case of the relay 410 — through the normally closed contact 400d of the driver belt switch 400 and the normally open contact of the driver seat switch 402 and — in the case of the relay 411 — through the normally closed contact 401d of the passenger belt switch 401 and the normally open contact 403b of the passenger seat switch 403.

In the absence of the transmission switch 17 or an equivalent shutoff switch in the vehicle, a permanent electric connection is maintained in their stead. Also, the direct connection between the solenoids of the activating relays 42 and 43 and between these solenoids and the normally closed contact 402d and the movable contact 402c of the driver seat switch 402 are omitted.

The mode of operation of the circuit according to FIG. 4 corresponds to that of the embodiment illustrated in FIG. 1. When the connection to ground of the solenoids of the two activating relays 42 and 43 is interrupted by the logic relays 410, 411 responding to the position of the belt and seat switches 400–403, the two activating relays 42 and 43 are in their position of rest shown in FIG. 4. If there is applied a volatage to the switch-on contact 110, the warning system 14, 15 will be activated because of the conducting (closed) state of the normally closed contact of the actuating relay 42. When now the starter contact 111 is actuated (that is, the battery voltage is applied thereto), an energization of the starter 12 is not possible since the connection thereto is interrupted by virtue of the non-conducting (open) state of the normally open contact of the actuating relay 43. If a ground connection for the solenoids of the relays 42 and 43 is reestablished by a certain position of the seat and belt switches, then both actuating relays 42 and 43 are energized and thus the warning system 14, 15 is in a deactivated state, since the normally closed contact of the relay 42 will now be open. On the other hand, due to the now closed position of the normally open contact of the relay 43, the starter 12 can be energized, provided the transmission switch 17 is in its shown neutral or parking position. When the driver seat switch 402 is operated, at the moment the driver seat is occupied, the ground connection of the solenoids of the actuating relays 42 and 43 is interrupted due to the opening of the contact 402d. At the same time, the relay 410 is energized since its solenoid is now grounded through the normally closed contact 400d of the driver belt switch 400 and the now closed (but normally open) contact 402b of the driver seat switch 402. The energizing circuit for and including the relay 410 is thus closed. A second connection to ground exists through the now closed (but normally open) twin contacts of the relay 410. If the driver belt switch 400 is operated upon fastening the associated seat belt, the relay 410 remains, because of the second connection to ground in an energized condition, despite the opening of the contact 400d as the driver belt is fastened. The afore-noted second connection to ground thus provides a closed holding circuit for and including the relay 410. The connection to ground of the actuating relays 42 and 43 is maintained through the now closed (normally open) contact 400b of the driver belt switch 400, the normally closed contact 403d of the passenger seat switch 403, the now closed twin contacts of the relay 410 and the now closed (normally open) contact 402b of the driver seat switch 402. If at the passenger seat the corresponding switches 401 and 403 are also actuated, then a connection to ground of the actuating relays 42 and 43 is effected through corresponding conductors at the passenger seat system. In case a belt switch 400 or 401 is operated prior to the operation of the associated seat switch 402 or 403, the corresponding logic relays 410, 411 cannot attract, since the energizing circuit of the relays 410, 411 will be interrupted by the opening of contacts 400d and/or 401d. A connection to ground of the actuating relays 42 and 43 is no longer completed and, as a result, the starter 12 cannot be energized and the warning system 14, 15 will be activated.

It is feasible to simply interchange the logic circuit 13 and the belt and seat switches 180–183 of the circuits according to FIGS. 1–3 and the logic circuit 410, 411 and the seat and belt switches 400–403 according to the circuit shown in FIG. 4. The mode of operation of the circuit will remain the same.

Figure 5:
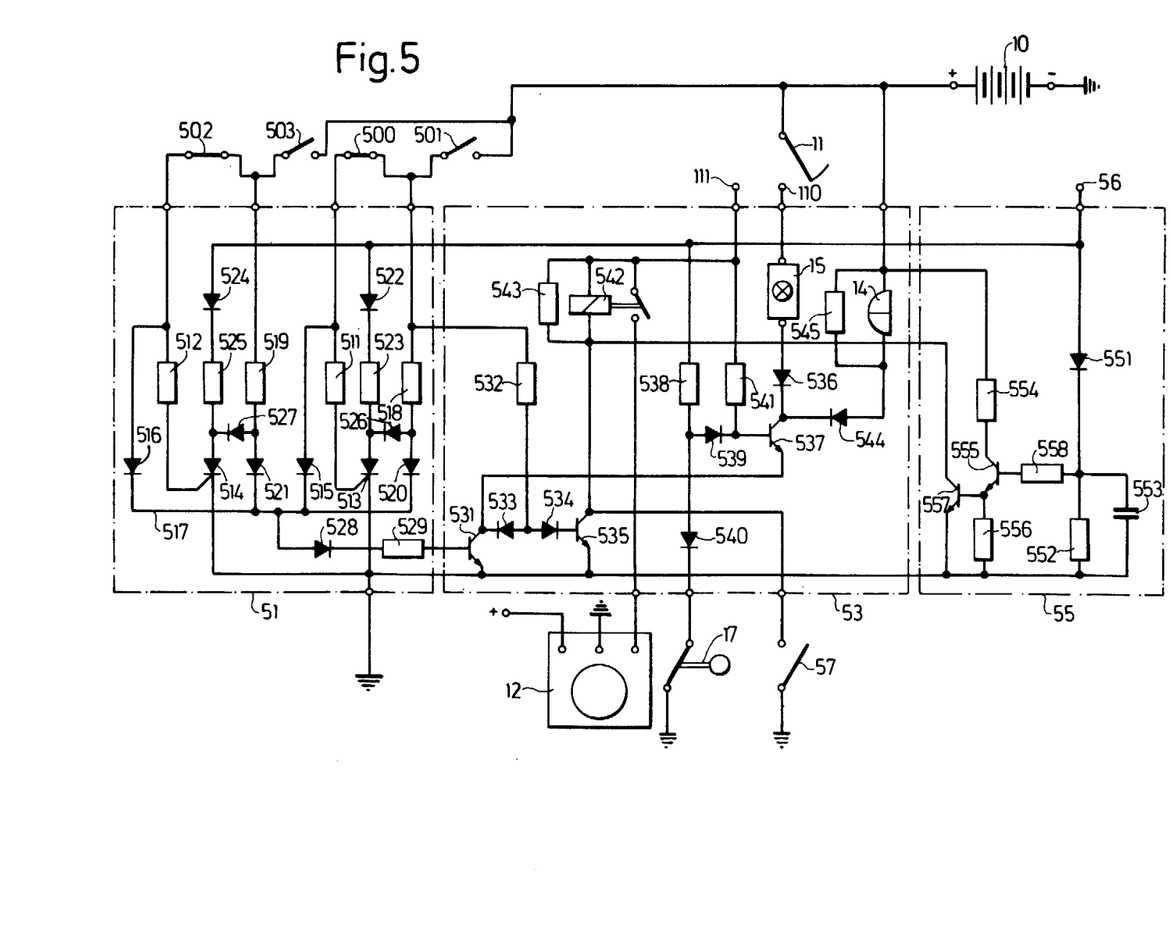
FIG. 5 is a circuit diagram of a fifth embodiment of the invention including thyristors and transistors as switching circuit components.

Referring now to FIG. 5, there is illustrated a circuit diagram of a fifth embodiment of the invention which includes semiconductor circuit components. This embodiment comprises in essence a logic circuit 51 of the normally closed belt switches 500, 502 and the normally open seat switches 501, 503 and further comprises an activating circuit 53 and a delay circuit 55. The positive pole of the battery 10 is connected to the normally open contact of the driver seat switch 501 and the passenger seat switch 503. The movable contact of each seat switch 501, 503 is respectively connected through one belt switch 500, 502 and one resistance 511, 512 to the control electrode of a respective thyristor 513, 514 each constituting a threshold switch. The connection of the positive pole of the battery 10 to the control electrode of the thyristor 513 through driver seat and belt switches 501, 500 and resistance 511 constitutes a firing circuit for the thyristor 513. Similarly, the connection of the positive pole of the battery 10 to the control electrode of thyristor 514 through passenger seat and belt switches 503, 502 and resistance 512 constitutes a firing circuit for the thyristor 514. Further, the belt switches 500, 502 are also connected through a respective diode 515, 516 to a diode linking conductor 517. The junction between the driver seat switch 501 and the driver belt switch 500 and the junction between the passenger seat switch 503 and the passenger belt switch 502 are connected through a respective resistance 518, 519 and a respective diode 520, 521 to the diode linking conductor 517 in the logic circuit 51. A terminal 56 from which an electric voltage may be applied only when the engine is in gear and running, is grounded through the series connection of a diode 522, a resistance 523 and the thyristor 513. The terminal 56 is preferably connected to the generator of the vehicle. The terminal 56 is also grounded through a second series connection of a diode 524, a resistance 525 and the thyristor 514. The anodes of the diode 520 and the thyristor 513 are connected to one another through a diode 526, whereas the anodes of the diode 521 and the thyristor 514 are connected to one another through a diode 527. The diode linking conductor 517 is connected through a further diode 528 and a resistance 529 to the base of an npn-transistor 531 constituting a first activating switch in the activating circuit 53. The junction between the driver seat switch 501 and the driver belt switch 500 is connected through a resistance 532 and a diode 533 to the collector of the first activating transistor 531. In addition, the junction between the resistance 532 and the diode 533 is connected through a further diode 534 to the base of an npn-transistor 535 constituting a second activating switch in the activating circuit 53. The emitters of the two transistors 531 and 535 are grounded. In the activating circuit 53 the switch-on contact 110 is connected to the collector of the first transistor 531 through the visual warning device 15, a diode 536 and the collector-emitter path of an npn-transistor 537 constituting a third activating switch. The terminal 56 is connected through a resistance 538 and a diode 539 with the base of the third transistor 537 and is grounded through a further diode 540 and the transmission switch 17. It is thus seen that a voltage may be taken from the terminal 56 only when the switch 17 is open, that is, when the engine is in gear. The starter contact 111 is connected through a resistance 541 with the base of the third transistor 537 and through the solenoid of an auxiliary relay 542 with the collector of the second transistor 535 and also, through the normally open contacts of the auxiliary relay 542, with the starter relay (not shown) of the starter 12. A suppressor resistance 543 is connected in parallel with the solenoid of the auxiliary relay 542. The collector of the second transistor 535 is grounded through a switch 57 which is preferably coupled to and thus operated by the hood of the vehicle. The positive pole of the battery 10 is connected through the buzzer 14 and a diode 544 to the collector of the third transistor 537. A suppressor resistance 545 is connected in parallel with the buzzer 14.

In the delay circuit 55 the terminal 56 is grounded through a diode 551 and an RC-member formed of a resistance 552 and a condenser 553 connected in parallel. The positive pole of the battery 10 is grounded through the series connection of a resistance 554, the collector-emitter path of a fourth npn-transistor 555 and a resistance 556. The junction between the solenoid of the auxiliary relay 542 and the collector of the second transistor 535 is grounded through the collector-emitter path of a fifth transistor 557. The junction between the diode 551 and the resistance 552 is connected through a resistance 558 to the base of the fourth transistor 555. The emitter of the fourth transistor 555 is connected to the base of the fifth transistor 557.

The operation of the fifth embodiment according to FIG. 5 also corresponds in essence to that of the embodiments described hereinbefore.

First the operation of the logic circuit 51 will be described. Since the circuit arrangements for the driver seat and the passenger seat are identical and together control the base of the first actuating transistor 531 in the activating circuit 53, the operational description is limited to only one of these two systems.

When the driver seat switch 501 is operated, i.e., closed at the moment the driver seat is occupied, the positive pole of the battery is connected to the anode of thyristor 513 via the resistance 518 and diode 526, and to the control electrode of the thyristor 513 via the belt switch 500 and the resistance 511, thus causing the thyristor 513 to fire. Additionally, closure of the seat switch 501 completes the connection between the battery 10 and the base of the first transistor 531 through the diode 515, the diode 528 and the resistance 529. The voltage behind the resistance 518 is thus short-circuited to ground through the diode 526 and the fired thyristor 513, and therefore has no effect on the transistor 531. If the driver seat belt is fastened, that is, the associated belt switch 500 is opened, the current connection to the base of the first transistor 531 is interrupted and the transistor blocks. The fired thyristor 513 remains nevertheless in a conducting state as a result of the connection between the anode thereof and the battery 10. In case the driver belt switch 500 is actuated prior to the actuation of the driver seat switch 501, the thyristor 513 cannot fire. In such an event there is no short-circuiting to ground of the battery voltage through the diode 526 and the thyristor 513, since the thyristor remains in its blocking or nonconducting state. The battery voltage is therefore applied to the base of the first transistor 531 by virtue of the connection through the diode 520, the diode 528 and the resistance 529. Thus, the transistor 531 is switched to its conducting state. Short-period removals of load from the seat during travel caused, for example, by bumps in the road have no effect on the circuit since current continues to flow to ground through the terminal 56, the diode 522, the resistance 523, and the thyristor 513 which remains in its conducting state.

The second activating transistor 535 in the activating circuit 53 is controlled through the driver seat switch 501, the resistance 532 and the diode 534. When the seat switch 501 is actuated, a voltage is applied to the base of the second activating transistor 535 and thus the transistor switched to its conducting state. When now a voltage is applied to the starter contact 111, the auxiliary relay 542 can be energized which then causes energization of the starter 12. If, on the contrary, the seat switch or the belt switch is in an incorrect position, the first activating transistor 531 is in its conducting state and the voltage behind the resistance 532 is short-circuited to ground through the diode 533 and the first activating transistor 531. The second activating transistor 535 blocks and thus energization of relay 542 and starting of the engine is not possible. In order to, nevertheless, permit in particular cases a starting of the engine, the second activating transistor 535 is short-circuited, in the lifted position of the hood, through the hood switch 57 and also through the delay circuit 55. Thus, in case of repair work, for example, the engine can be started independently from the position of the seat and belt switches by virtue of the hood-operated switch 57. During vehicle travel the condenser 553 in the delay circuit 55 is charged through the terminal 56 and the diode 551. In case of an unintentional engine shutoff no current flows through the terminal 56. The voltage at the condenser 553 slowly discharges through the resistance 552. During a predetermined interval, preferably 3 minutes, the voltage is large enough to switch the transistor 555 to its conducting state through the resistance 558. The transistor 555, in turn, switches the transistor 557 to its conducting state. Thus, during the aforenoted time interval the transistor 557 is rendered conducting and consequently an engine starting operation is possible. Thereafter the transistor 557 blocks.

The warning system 14, 15 is energizable only when both the first activating transistor 531 and the third activating transistor 537 are in their conducting state. The latter will be in its conducting state when either the starter contact 111 is closed by the ignition switch 11 so that the base of the transistor 537 is controlled through the resistance 541 or if, during travel of the vehicle, the terminal 56 is current conducting and the base of the transistor 537 is controlled through the resistance 538 and the diode 539. The latter situation is possible only in an open position of the transmission switch 17 because otherwise the voltage is short-circuited to ground through the diode 540. The diodes 536 and 544 serve for the separation of the two components 14 and 15 of the warning system, while the resistances 545 and 543 serve for eliminating noise signals.

Figure 6:
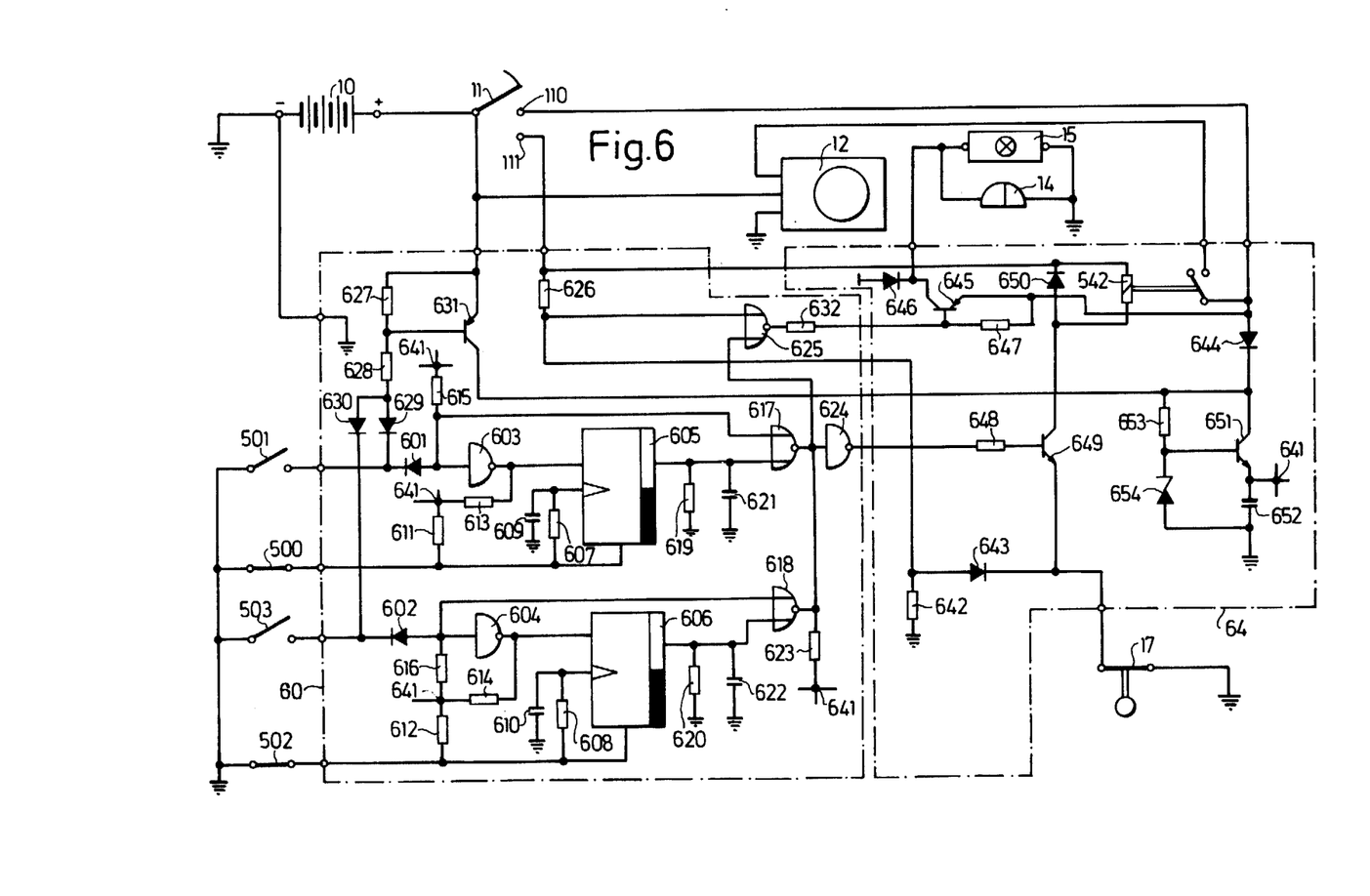
FIG. 6 is a circuit diagram of a sixth embodiment of the invention including semiconductor logic circuit components.

Turning now to FIG. 6, there is shown a circuit diagram of a sixth embodiment of the invention which is designed to include logic semiconductor components and which may be built as an integrated circuit. The seat and belt switches 500–503 correspond to the switches described in connection with FIG. 5. In this case they are connected in parallel and are grounded at one side. Since in the logic circuit 60 the circuit arrangement for the driver seat and the passenger seat are identical, the description will be limited to the circuit arrangement for the driver seat. The corresponding circuit components for the passenger seat are designated with reference numerals increased by one.

The driver seat switch 501 is connected through an inversely polarized diode 601 and an inverter 503 to the preparatory input of a bistable circuit formed by a D-type flip-flop circuit 605 constituting a threshold switch. The driver belt switch 500 is connected with the setting input and, through a resistance 607, with the trigger input of the flip-flop circuit 605. The trigger input is additionally connected to ground through a condenser 609. A terminal 641 of a constant voltage source of, for example 5 volts, is connected through a resistance 611 to the setting input and through a resistance 613 to the preparatory input of the flip-flop circuit 605 and also, through a resistance 615 to the junction between the diode 601 and the inverter 603. This junction is also connected to one input of a NOR gate 617. The output of the flip-flop circuit 605 is connected to the other input of the NOR gate 617 and is grounded through a resistance 619 and a parallel-connected condenser 621.

The voltage terminal 641 is connected through a resistance 623 with the outputs of the two NOR gates 617, 618 to the input of an inverter 624 and to one input of a NOR gate 625. The other input of the NOR gate 625 is connected through a resistance 626 to the starter contact 111 and is grounded through a resistance 642 or a series connection of a diode 643 and the transmission switch 17. The positive pole of the battery 10 is connected through a voltage divider formed of two resistances 627, 628 and through respective diodes 629, 630 to respective seat switches 501 and 503. The junction of the two resistances 627 and 628 is connected to the base of a pnp-transistor 631. The switch-on contact 110 is connected through a diode 644 and the collector-emitter path of the transistor 631 with the positive pole of the battery 10.

The output of the NOR gate 625 is connected through a resistance 632 with the base of a pnp-transistor 645 constituting a first activating switch for the warning system 14, 15. The switch-on contact 110 is connected through the emitter-collector path of the first activating transistor 645 to the warning system 14, 15. A protecting diode 646 is connected parallel to the warning system 14, 15. The emitter of the first activating transistor 645 is connected to its base through a resistance 647.

The output of the inverter 624 is connected through a resistance 648 to the base of an npn-transistor 649 constituting a second activating switch for the starter locking system. The starter contact 111 is grounded through the solenoid of the auxiliary relay 542, the collector-emitter path of the second activating transistor 649 and the transmission switch 17. A protecting diode 650 is connected parallel with the solenoid of the auxiliary relay 542. The switch-on contact 110 is connected through the normally open contact of the auxiliary relay 542 to the starter relay (not shown) of the starter 12.

To generate the 5-volt voltage at the voltage terminal 641, a constant voltage source is provided by connecting the cathode of the diode 644 to ground through a series connection of the collector-emitter path of an npn-transistor 651 and a condenser 652, by connecting a resistance 653 between the base and the collector of the transistor 651, and by connecting a Zener diode 654 between the base of the transistor 651 and ground. The 5 volt voltage terminal 641 is connected to the emitter of the transistor 651.

The operation of the sixth embodiment illustrated in FIG. 6 corresponds approximately to those of the previously discussed embodiments. The operating voltage necessary for the logic circuit elements is generated in a voltage source formed of the transistor 651, the condenser 652, the resistance 653 and the Zener diode 654. The required voltage of 5V is applied to the voltage terminal 641 if either the switch-on contact 110 of the ignition switch 11 is connected with the battery 10 or if the transistor 631 is switched to its conducting state by lowering the potential at its base through one of the diodes 629, 630 and the voltage divider 627, 628 by virtue of the actuation of one of the seat switches 501, 503. In either of these cases the transistor 651 is switched to its conducting state by virtue of the control through the resistance 653 and generates at the condenser 652 the required voltage of 5V. The Zener diode 654 serves for stabilization. The description of the operation of the logic circuit 60 is limited to the driver seat circuit. Corresponding components of the identical passenger seat circuit are given reference numerals increased by one.

If, in the presence of a voltage at the voltage terminal 641 the driver seat switch 501 is actuated, the input of the inverter 603 is grounded through the diode 601. At the output of the inverter 603 which is connected with the preparatory input of the flip-flop circuit 605, there will therefore appear a "1" signal. Since one input of the NOR gate 617 is now grounded through the diode 601 and the driver seat switch 501 and since at the other input of the NOR gate 617 which is connected with the output of the flip-flop circuit 605 there also appears a "0" signal because the setting input of the flip-flop circuit 605 is grounded through the driver belt switch 500, at the output of the NOR gate 617 there appears a 1 signal. The latter is inverted by the inverter 624 into a 0 signal which effects a blocking of the transistor 649. Consequently, no current can flow from the starter contact 111 through the auxiliary relay 542 and therefore the starter 12 cannot be energized. In addition, the 1 signal at the output of the NOR gate 617 is applied to one input of the NOR gate 625. The other input of the NOR gate 625 is grounded through the diode 643 and the transmission switch 17. Thus, at the output of the NOR gate 625 a 0 signal appears. The collector-emitter path of the transistor 645 is consequently in a conducting state and, as a result, the warning system 14, 15 is activated.

When the driver fastens his safety belt, the belt switch 500 opens and the 1 signal at the preparatory input of the flip-flop circuit 605 is transmitted to its output as a result of a trigger pulse produced by the RC circuit 607, 609. At the output of the NOR gate 617 there thus appears a 0 signal. The starter 12 can thus be operated and the warning system 14, 15 does not respond. Short-period removals of the load from the seat and the associated actuation of the seat switch 501, caused, for example, by bumps in the road, have no effect since the flip-flop circuit 605 is not triggered and therefore at its output the 1 signal is continuously maintained. Whether a 1 signal or a 0 signal is applied through the seat switch 501 to the other input of the NOR gate 617 is of no consequence since in any event a 0 signal will appear at its output.

In case the belt switch 500 is actuated prior to the actuation of the seat switch 501, then, because of the open seat switch 501, a 1 signal appears at the input of the inverter 603. Thus, to the preparatory input of the flip-flop circuit 605 there is applied a 0 signal which is transmitted to the output of the flip-flop circuit 605 and thus also, to one input of the NOR gate 617. If thereafter the seat switch 501 is actuated, the second input of the NOR gate 617 will also receive a 0 signal and thus there appears a 1 signal at the output of the NOR gate 617. As a result, the warning system 14, 15 is activated and the starter 12 cannot be operated.

If the transmission switch 17 is opened, the starter 12 cannot be operated since the circuit of the auxiliary relay 542 is open. That input of the NOR gate 625 which is connected to the starter contact 111 through the resistance 626 has now a 1 signal because of the resistance 642. Upon actuation of the starter contact 111 and in case of an open transmission switch 17 the warning system 14, 15 is actuated and signals an error. The RC members 619, 621 and 620, 622 at the output of the flip-flop circuits 605 and 606, respectively, ensure a unique output state when the supply voltage is switched on.

It will be understood that the above description of the present invention is susceptible to various modifications, changes and adaptations, and the same are intended to be comprehended within the meaning and range of equivalents of the appended claims.

We claim:

1. In a vehicle safety system for the protection of the occupants of the vehicle having seats for the occupants with at least one vehicle seat being provided with a safety seat belt, said vehicle safety system having a single pole, single throw seat switch which is associated with said one vehicle seat and which selectively assumes a first or a second position in response to the unoccupied or occupied state, respectively, of said one vehicle seat; a single pole, single throw belt switch which is associated with said safety seat belt and which selectively assumes a first or a second position in response to the unfastened or fastened state, respectively, of said safety seat belt; a starter circuit for the starter of the engine of the vehicle, said starter circuit having first and second states in which starting of the engine is respectively prevented and permitted; said starter circuit having a vehicle ignition switch provided with a movable contact, a starter contact and a switch-on contact; and a warning circuit having a first state in which it produces a warning signal for the occupants of the vehicle and a second state in which no warning signal is produced, the improvement comprising in combination:

activating relay means for setting said starter and warning circuits in their respective said first states when said activating relay means is in a first state and for setting said starter and warning circuits in their respective said second states when said activating relay means is in a second state; said activating relay means including a solenoid having first and second terminals; said first terminal being connected to said switch-on contact; said relay further including contacts in said starter and warning circuits; and logic circuit means connected to said second terminal of said solenoid and being responsive to the respective positions of said seat and belt switches for controlling the energization and de-energization of said solenoid to set said activating relay means in said first state whenever said seat switch is in its said second position and said belt switch is in its said first position and whenever said seat belt switch and said seat switch are in their respective said second positions but said belt switch is placed in its said second position prior to placing said seat switch in its said second position, whereby the starting of the engine of the vehicle is prevented and a warning signal is emitted whenever said one vehicle seat is occupied and the associated seat belt is either not fastened or had been fastened prior to occupying said seat.

2. In a vehicle safety system for the protection of the occupants of the vehicle having seats for the occupants with at least one vehicle seat being provided with a safety seat belt, said vehicle safety system having a single pole, single throw seat switch which is associated with said one vehicle seat and which selectively assumes a first or a second position in response to the unoccupied or occupied state, respectively, of said one vehicle seat; a single pole, single throw belt switch which is associated with said safety seat belt and which selectively assumes a first or a second position in response to the unfastened or fastened state, respectively, of said safety seat belt; a starter circuit for the starter of the engine of the vehicle, said starter circuit having first and second states in which starting of the engine is respectively prevented and permitted; said starter circuit having a vehicle ignition switch provided with a movable contact, a starter contact and a switch-on contact; and a warning circuit having a first state in which it produces a warning signal for the occupants of the vehicle and a second state in which no warning signal is produced, the improvement comprising in combination:

activating relay means for setting said starter and warning circuits in their respective said first states when said activating relay means is in a first state and for setting said starter and warning circuits in their respective said second states when said activating relay means is in a second state; said activating relay means being formed of first and second relays, said first relay having a normally open contact in said starter circuit and a solenoid having a terminal connected to one of said switch-on and said starter contacts, said second relay having a normally closed contact in said warning circuit and a solenoid having a terminal connected to said switch-on contact; and logic circuit means connected to another terminal of the solenoid of said first relay and to another terminal of the solenoid of said second relay, said logic circuit means being responsive to the respective positions of said seat and belt switches for controlling the energization and de-energization of the solenoids of the two relays to set said activating relay means in said first state whenever said seat switch is in its said second position and said belt switch is in its said first position and whenever said seat belt switch and said seat switch are in their respective said second positions but said belt switch is placed in its said second position prior to placing said seat switch in its said second position, whereby the starting of the engine of the vehicle is prevented and a warning signal is emitted whenever said one vehicle seat is occupied and the associated seat belt is either not fastened or had been fastened prior to occupying said seat.

3. In a vehicle safety system for the protection of the occupants of the vehicle having seats for the occupants with at least one vehicle seat being provided with a safety seat belt, said vehicle safety system having a single pole, single throw seat switch which is associated with said one vehicle seat and which selectively assumes a first or a second position in response to the unoccupied or occupied state, respectively, of said one vehicle seat; a single pole, single throw belt switch which is associated with said safety seat belt and which selectively assumes a first or a second position in response to the unfastened or fastened state, respectively, of said safety seat belt; a starter circuit for the starter of the engine of the vehicle, said starter circuit having first and second states in which starting of the engine is respectively prevented and permitted; said starter circuit having a vehicle ignition switch provided with a movable contact connected to one terminal of a voltage source, a starter contact and a switch-on contact; and a warning circuit having a first state in which it produces a warning signal for the occupants of the vehicle and a second state in which no warning signal is produced, the improvement comprising in combination:

a shut-off switch in said starter circuit, said shut-off switch having one of its terminals connected to another terminal of said voltage source;

activating relay means for setting said starter and warning circuits in their respective said first states when said activating relay means is in a first state and for setting said starter and warning circuits in their respective said second states when said activating relay means is in a second state, said activating relay means including a first and a second single pole double throw relay each having a solenoid, a movable contact, a normally open contact and a normally closed contact, said first relay having its normally closed contact connected to said starter contact through said warning circuit, its normally open contact connected to the normally open contact of said second relay and its movable contact connected to said starter; said second relay having its solenoid connected in series between said switch-on contact and the other terminal of said shut-off switch, its movable contact connected to said starter contact and its normally closed contact connected to said switch-on contact; and logic circuit means connected to the solenoid of said first relay, the solenoid of said first relay being connected in series with said switch-on contact and said logic circuit means; said logic circuit means being responsive to the respective positions of said seat and belt switches for controlling the energization and de-energization of the solenoid of said first relay to set said activating relay means in said first state whenever said seat switch is in its said second position and said belt switch is in its said first position and whenever said seat belt switch and said seat switch are in their respective said second positions but said belt switch is placed in its said second position prior to placing said seat switch in its said second position, whereby the starting of the engine of the vehicle is prevented and a warning signal is emitted whenever said one vehicle seat is occupied and the associated seat belt is either not fastened or had been fastened prior to occupying said seat.

4. In a vehicle safety system for the protection of the occupants of the vehicle having seats for the occupants with at least one vehicle seat being provided with a safety seat belt, said vehicle safety system having a single pole, single throw seat switch which is associated with said one vehicle seat and which selectively assumes a first or a second position in response to the unoccupied or occupied state, respectively, of said one vehicle seat; a single pole, single throw belt switch which is associated with said safety seat belt and which selectively assumes a first or a second position in response to the unfastened or fastened state, respectively, of said safety seat belt; a starter circuit for the starter of the engine of the vehicle, said starter circuit having first and second states in which starting of the engine is respectively prevented and permitted; and a warning circuit having a first state in which it produces a warning signal for the occupants of the vehicle and a second state in which no warning signal is produced, the improvement comprising in combination:

a. activating switch means connected to said starter and warning circuits for setting said starter and warning circuits in their respective said first states when said activating switch means is in a first state and for setting said starter and warning circuits in their respective said second states when said activating switch means is in a second state; and b. logic circuit means responsive to the respective positions of said seat and belt switches for controlling said activating switch means to set said activating switch means in said first state whenever said seat switch is in its said second position and said belt switch is in its said first position and whenever said seat belt switch and said seat switch are in their respective said second positions but said belt switch is placed in its said second position prior to placing said seat switch in its said second position, whereby the starting of the engine of the vehicle is prevented and a warning signal is emitted whenever said one vehicle seat is occupied and the associated seat belt is either not fastened or had been fastened prior to occupying said seat; said logic circuit means including:

1. a first relay having a solenoid, a movable contact and a normally closed contact cooperating therewith;
2. a second relay having a solenoid, a movable contact and a normally open contact cooperating therewith, said first and second relays constituting threshold switches;
3. a first energizing circuit for the solenoid of said first relay, said first energizing circuit contains the series connection of the solenoid of said first relay and said belt switch;
4. a second energizing circuit for the solenoid of said second relay, said second energizing circuit containing the series connection of said seat switch, the solenoid of said second relay, and the normally closed contact and the movable contact of said first relay; and
5. a holding circuit for the solenoid of said second relay, said holding circuit contains the series connection of said seat switch, said solenoid of said second relay, and the normally open contact and the movable contact of said second relay, whereby the solenoid of said second relay is energizable by said seat switch only in said unfastened state of said safety seat belt.

5. In a vehicle safety system for the protection of the occupants of the vehicle having seats for the occupants with at least one vehicle seat being provided with a safety seat belt, said vehicle safety system having a single pole, single throw seat switch which is associated with said one vehicle seat and which selectively assumes a first or a second position in response to the unoccupied or occupied state, respectively, of said one vehicle seat; a single pole, single throw belt switch which is associated with said safety seat belt and which selectively assumes a first or a second position in response to the unfastened or fastened state, respectively, of said safety seat belt; a starter circuit for the starter of the engine of the vehicle, said starter circuit having first and second states in which starting of the engine is respectively prevented and permitted; and a warning circuit having a first state in which it produces a warning signal for the occupants of the vehicle and a second state in which no warning signal is produced, the improvement comprising in combination:

activating switch means connected to said starter and warning circuits for setting said starter and warning circuits in their respective said first states when said activating switch means is in a first state and for setting said starter and warning circuits in their respective said second states when said activating switch means is in a second state; and logic circuit means responsive to the respective positions of said seat and belt switches for controlling said activating switch means to set said activating switch means in said first state whenever said seat switch is in its said second position and said belt switch is in its said first position and whenever said seat belt switch and said seat switch are in their respective said second positions but said belt switch is placed in its said second position prior to placing said seat switch in its said second position, whereby the starting of the engine of the vehicle is prevented and a warning signal is emitted whenever said one vehicle seat is occupied and the associated seat belt is either not fastened or had been fastened prior to occupying said seat; said logic circuit means including at least one thyristor constituting a threshold switch and connected to said belt switch and said seat switch; circuit means responsive to the respective positioning of said seat and belt switches for controlling the firing of said thyristor; and further circuit means responsive to the state of said thyristor for producing an output signal for controlling the states of said actuating switch means.

6. In a vehicle safety system for the protection of the occupants of the vehicle having seats for the occupants with at least one vehicle seat being provided with a safety seat belt, said vehicle safety system having a single pole, single throw seat switch which is associated with said one vehicle seat and which selectively assumes a first or a second position in response to the unoccupied or occupied state, respectively, of said one vehicle seat; a single pole, single throw belt switch which is associated with said safety belt and which selectively assumes a first or a second position in response to the unfastened or fastened state, respectively, of said safety seat belt; a starter circuit for the starter of the engine of the vehicle, said starter circuit having first and second states in which starting of the engine is respectively prevented and permitted; and a warning circuit having a first state in which it produces a warning signal for the occupants of the vehicle and a second state in which no warning signal is produced, the improvement comprising in combination:

activating switch means connected to said starter and warning circuits for setting said starter and warning circuits in their respective said first states when said activating switch means is in a first state and for setting said starter and warning circuits in their respective said second states when said activating switch means is in a second state; and logic circuit means responsive to the respective positions of said seat and belt switches for controlling said activating switch means to set said activating switch means in said first state whenever said seat switch is in its said second position and said belt switch is in its said first position and whenever said seat belt switch and said seat switch are in their respective said second positions but said belt switch is placed in its said second position prior to placing said seat switch in its said second position, whereby the starting of the engine of the vehicle is prevented and a warning signal is emitted whenever said one vehicle seat is occupied and the associated seat belt is either not fastened or had been fastened prior to occupying said seat; said logic circuit means including a bistable circuit constituting a threshold switch, said bistable circuit being a D-type flip-flop circuit having a preparatory input, a setting input, a trigger input and an output; an inverter, and circuit means for connecting said output of said flip-flop to said activating switch means, said seat switch is a normally open switch and is connected to said preparatory input through said inverter; and said belt switch is a normally closed switch and connected to said trigger input and said setting input.

7. In a vehicle safety system for the protection of the occupants of the vehicle having seats for the occupants with at least one vehicle seat being provided with a safety seat belt, said vehicle safety system having a seat switch which is associated with said one vehicle seat and which selectively assumes a first or a second position in response to the unoccupied or occupied state, respectively, of said one vehicle seat; a belt switch which is associated with said safety seat belt and which selectively assumes a first or a second position in response to the unfastened or fastened state, respectively, of said safety seat belt; a starter circuit for the starter of the engine of the vehicle, said starter circuit having first and second states in which starting of the engine is respectively prevented and permitted; and a warning circuit having a first state in which it produces a warning signal for the occupants of the vehicle and a second state in which no warning signal is produced, the improvement comprising in combination:

activating switch means for setting said starter and warning circuits in their respective said first states when said activating switch means is in a first state and for setting said starter and warning circuits in their respective said second states when said activating switch means is in a second state; said activating switch means includes first and second activating switches, said first activating switch being normally open and connected in said starter circuit and said second activating switch being connected in said warning circuit; and further including a normally open auxiliary switch connected across said first activating switch, said auxiliary switch being operatively connected to the hood of the vehicle so that starting of the engine is possible in a raised position of the hood independently from the state of said first activating switch; and logic circuit means responsive to the respective positions of said seat and belt switches for controlling said activating switch means to set said activating switch means in said first state whenever said seat switch is in its said second position and said belt switch is in its said first position and whenever said seat belt switch and said seat switch are in their respective said second positions but said belt switch is placed in its said second position prior to placing said seat switch in its said second position, whereby the starting of the engine of the vehicle is prevented and a warning signal is emitted whenever said one vehicle seat is occupied and the associated seat belt is either not fastened or had been fastened prior to occupying said seat.

8. A vehicle safety system as defined in claim 4, the improvement further comprising a third energizing circuit connected to and controlling the states of said activating switch means; said first and said second relays each having a further movable contact and a further normally closed contact connected in series in said third energizing circuit.

9. A vehicle safety system as defined in claim 5 wherein said seat switch is a normally open switch having one of its terminals connected to one pole of a source of d.c. voltage and its other terminal connected to one terminal of said belt switch; said belt switch is a normally closed switch; said circuit means for controlling the firing of said thyristor includes means for connecting the other terminal of said belt switch to the control electrode of said thyristor, and means for connecting one of the anode and cathode terminals of said thyristor to the common connection of said seat and belt switches and the other of said anode and cathode terminals to the other pole of said source of d.c. voltage; and said further circuit means includes means connecting said common connection of said seat and belt switches to said activating switch means.

10. A vehicle safety system as defined in claim 5 wherein said circuit means and said further circuit means each includes at least one diode for preventing mutual interferences therebetween.

11. A vehicle safety system as defined in claim 5 wherein said activating switch means includes a first transistor connected in said warning system and responsive to said output signal from said further switch means.

12. A vehicle safety system as defined in claim 11 wherein said transistor has its emitter-collector path connected in said warning circuit and its base connected to said further circuit means.

13. A vehicle safety system as defined in claim 11, further comprising: a vehicle ignition switch having a movable contact and a cooperating starter contact in said starter circuit, means for supplying a voltage solely when the vehicle is being driven by the vehicle engine; and a further transistor having its emitter-collector path connected in said warning circuit and its base connected to said means for supplying a voltage and to said starter contact.

14. A vehicle safety system as defined in claim 11 wherein said activating switch means includes a further transistor having its emitter-collector path connected in said starter circuit, and its base connected to said common connection of said seat and belt switches and to the emitter-collector path of said first transistor, whereby said base of said further transistor will be short circuited by the emitter-collector path of said first transistor, thus preventing a starting operation, whenever said first transistor is conducting as a result of improper conditions for said seat and belt switches.

15. A vehicle safety system as defined in claim 14 further comprising: means for supplying a voltage at a terminal solely when the vehicle is being driven by the vehicle engine; and time delay circuit means connected to said terminal and responsive to said voltage for short circuiting the emitter-collector path of said further transistor for a predetermined period of time after the voltage at said terminal disappears.

16. A vehicle safety system as defined in claim 6, including a voltage source connected through resistances to said belt and seat switches; and said circuit means for connecting the output of said flip-flop includes a NOR gate having two inputs, one input being connected to said seat switch and the other input being connected to the output of said flip-flop circuit.

17. A vehicle safety system as defined in claim 16 wherein said activating switch means includes a first transistor having its emitter-collector path connected in said warning circuit and a second transistor having its emitter-collector path connected in said starter circuit; and said circuit means for connecting the output of said flip-flop further includes further logic circuit means responsive to the output signal from said NOR gate for controlling the signal applied to the bases of said first and second transistors.

* * * * *